United States Patent [19]
deVos et al.

[11] Patent Number: 5,137,354
[45] Date of Patent: Aug. 11, 1992

[54] COMPUTER AIDED THREE DIMENSIONAL POSITIONING SENSING SYSTEM AND METHOD

[75] Inventors: Leon B. C. deVos, Schiedam; Johannes N. Th. M. Schouten, Vlaardingen, both of Netherlands

[73] Assignee: Spectra-Physics, Inc., San Jose, Calif.

[21] Appl. No.: 740,649

[22] Filed: Aug. 1, 1991

Related U.S. Application Data

[63] Continuation of Ser. No. 554,287, Jul. 18, 1990, abandoned, which is a continuation-in-part of Ser. No. 522,745, May 14, 1990, Pat. No. 5,076,690.

[51] Int. Cl.$^5$ .............................................. G01B 11/26
[52] U.S. Cl. .................................. 356/152; 235/467; 356/1; 364/449
[58] Field of Search ......................... 356/1, 152, 400; 235/467; 364/449

[56] References Cited

U.S. PATENT DOCUMENTS

| | | |
|---|---|---|
| 3,588,249 | 6/1971 | Studebaker . |
| 3,813,171 | 5/1974 | Teach et al. . |
| 3,873,226 | 3/1975 | Teach . |
| 3,997,071 | 12/1976 | Teach . |
| 4,030,832 | 6/1977 | Rando et al. . |
| 4,034,490 | 7/1977 | Teach . |
| 4,035,084 | 7/1977 | Ramsay ............................. 356/152 |
| 4,113,381 | 9/1978 | Epstein ........................... 356/152 X |
| 4,355,895 | 10/1982 | Cairns et al. ........................ 356/141 |
| 4,715,714 | 12/1987 | Gaechter et al. ................... 356/375 |
| 4,796,198 | 1/1989 | Boultinghouse et al. . |
| 4,830,489 | 5/1989 | Cain et al. . |
| 4,918,607 | 4/1990 | Wible ............................... 180/169 X |

OTHER PUBLICATIONS

Dutch Patent Application Translation Paper presented at I.S.A.R.C. (International Symposium on Automation and Robotics in Construction).

Primary Examiner—Stephen C. Buczinski
Attorney, Agent, or Firm—Killworth, Gottman, Hagan & Schaeff

[57] ABSTRACT

A position sensing system calculates the X-Y-Z coordinates of a point in space using triangulation and determines the orientation of an object located at that point. The triangulation calculation is based on the coordinates of at least three retroreflective elements spaced apart from each other and the measured angles between the lines projected radially outward from the point to each of the retroreflective elements. The accuracy of the measured angles is achieved by using a rotating member supported by dedicated hardware and controlled by software. The member rotates with a beam of light generated by a light transmitting and detecting device positionable at the point. The light transmitting and detecting device receives the beam of light reflected back from the retroreflective elements and generates an output signal in response thereto. A computer processes the output signals for use in calculating the X-Y-Z coordinates of the point and the orientation of the light transmitting and detecting device when it is positioned at the point.

11 Claims, 7 Drawing Sheets

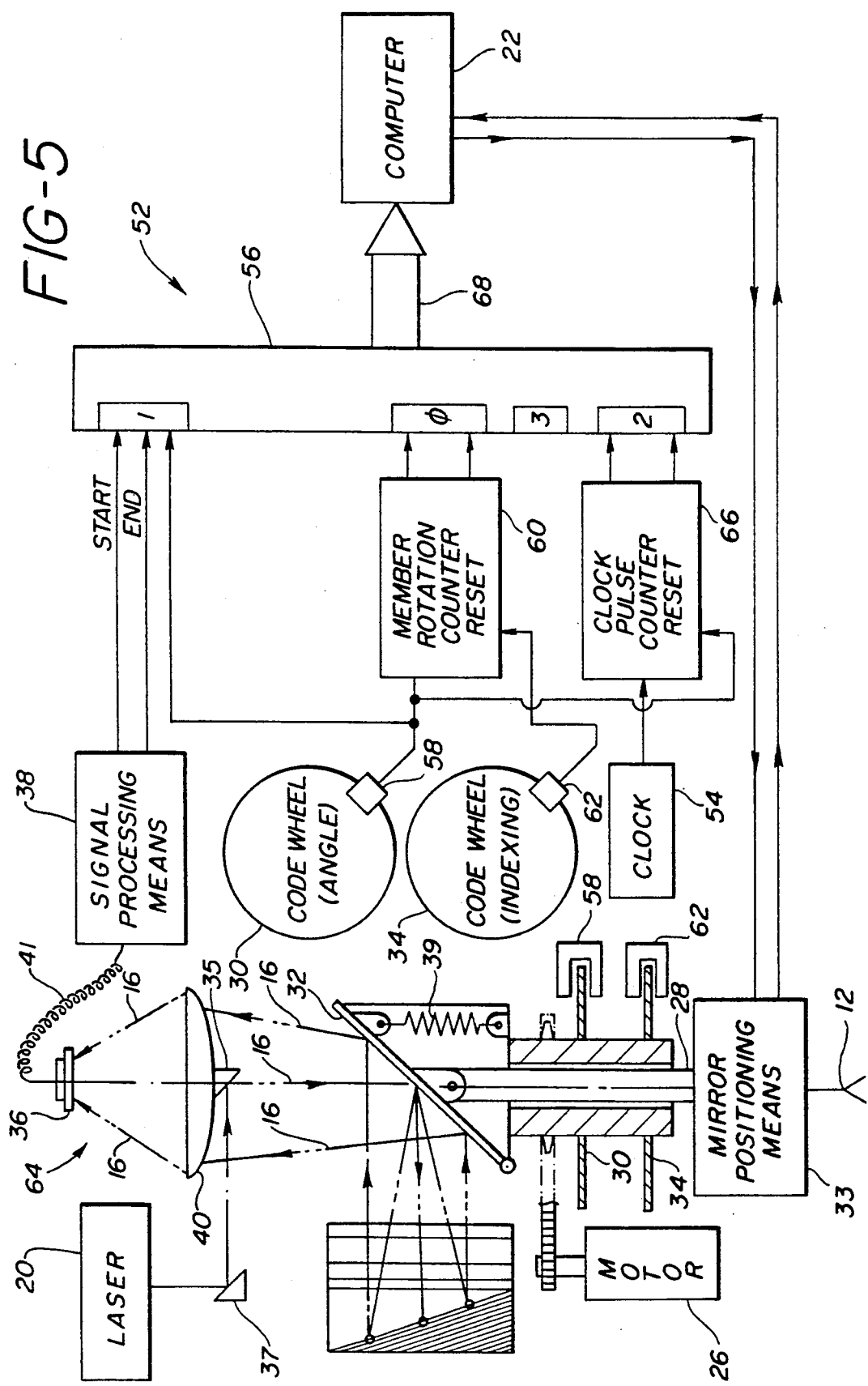

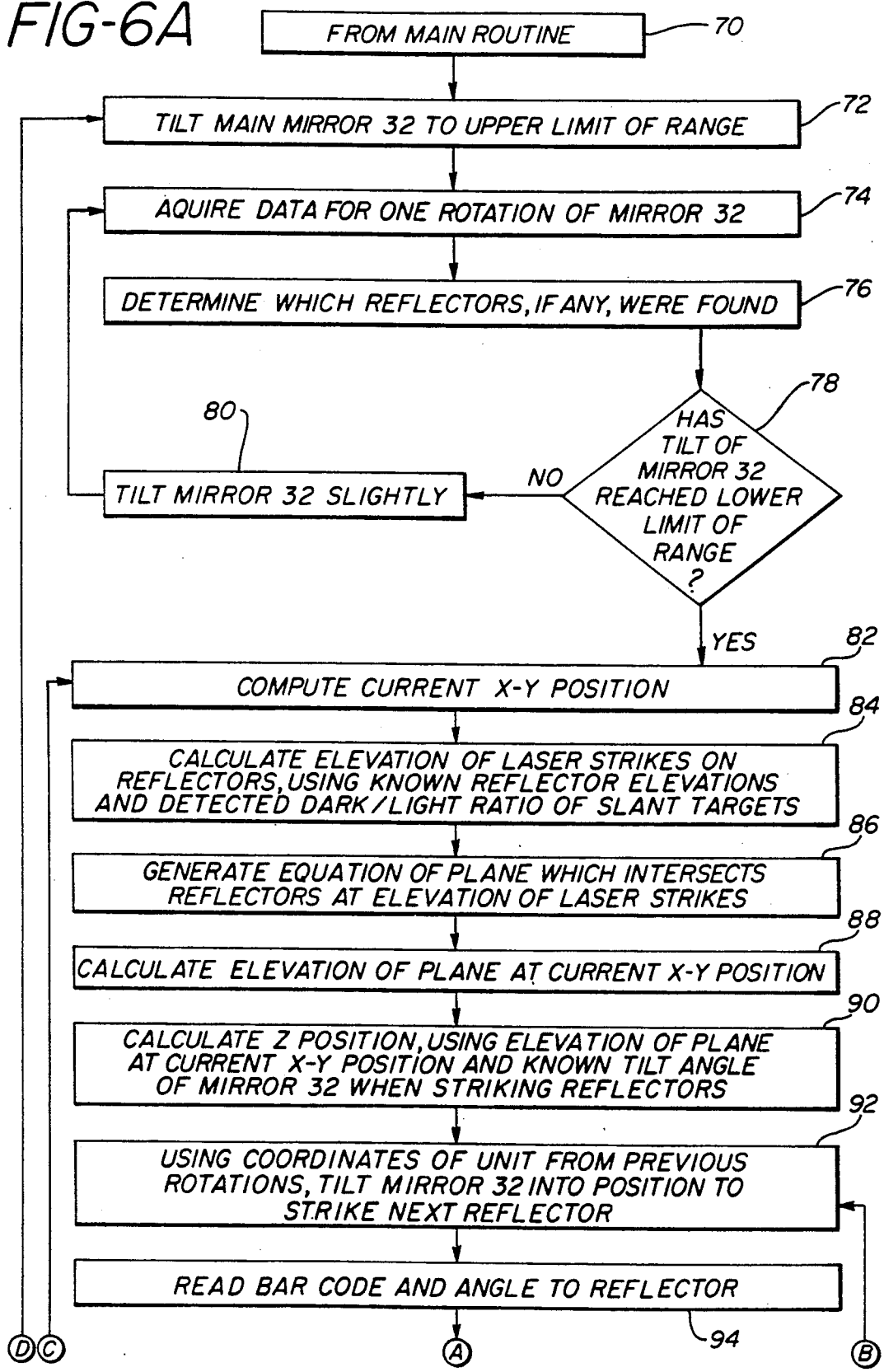

COMPUTER AIDED THREE DIMENSIONAL POSITIONING SENSING SYSTEM AND METHOD

BACKGROUND OF THE INVENTION

This application is a continuation of U.S. patent application Ser. No. 554,287 filed Jul. 18, 1990, now abandoned, which is a continuation-in-part of U.S. patent application Ser. No. 522,745, filed May 14, 1990, now U.S. Pat. No. 5,076,690.

The present invention relates generally to laser-based systems useful in construction applications and, more particularly, to a laser-based system and method for measuring the X-Y-Z coordinate of a point and the angular orientation of an object positioned at that point in a continuously changing frame of reference.

In the construction industry, the level of automation and robotization is very low. One reason for this is the difficulty of properly positioning machines and tools. In the construction of commercial buildings, for example, various points of reference have to be established, such as placement of floors, ceilings, electrical wiring, plumbing, and heating and cooling ducts. Establishing reference point is time consuming and expensive, particularly as such work is often contracted out to companies which specialize in this work. Moreover, for many applications, the machine has to move toward the product. When the reference point is continuously changing, the difficulty of positioning the machine is compounded.

In prior laser-based systems, such as that disclosed in U.S. Pat. No. 3,588,249, for example, a reference plane is established throughout a work site by a transmitter which emits laser energy in the level reference plane. The laser beam is projected radially outward from the transmitter and rotated continuously through 360 degrees to sweep around the entire work site. One or more receivers may be employed throughout the work site to sense the location of this reference plane. Such receivers may be mounted on a surveyor's rod, as described in U.S. Pat. No. 4,030,832, or they may be employed as part of a control system for construction or agricultural equipment, as described in U.S. Pat. Nos. 3,813,171; 3,873,226; 3,997,071; and 4,034,490.

In order to track the movement of a reference point, prior art laser systems, such as the laser survey system disclosed in U.S. Pat. No. 4,830,489, have provided not only elevation information, but also position information in two other axes. The system includes a laser transmitter, located at a reference position at a work site, which sweeps a laser beam radially in a reference plane. The system includes a receiver, located on mobile earthmoving equipment operating at the work site. The receiver has a sensor that determines the relative elevation of the laser reference plane. The receiver also includes a pair of reflectors, each of which reflects laser energy back to the transmitter. The laser transmitter also has a sensor which receives the reflected laser energy, and, in response thereto, produces receiver position information for transmission to the receiver.

The laser transmitter is designed to rotate the laser beam continuously through 360 degrees at a substantially constant angular velocity and thus sweep the beam past the two reflectors of the receiver once during each revolution. During each revolution of the laser beam, the transmitter receives back two short bursts or pulses of laser energy from the two reflectors. Thus, since the laser beam sweeps at a substantially constant angular velocity and the distance between the reflectors is fixed, the time period between receipt of these two pulses provides an accurate basis for the calculation of the range or distance of the receiver from the transmitter. However, since the accuracy of the range calculation is dependent upon a uniform rotational velocity for the laser beam, any variability in the rotational velocity will decrease the accuracy of the range calculation. However, this and other three-dimensional laser based systems are generally complex and expensive.

It is seen then that there is a need for a positioning system and method wherein highly accurate X-Y-Z position coordinates and orientation of a point, which are insensitive to deviations in the rotational velocity of the rotating light beam, can be determined.

SUMMARY OF THE PRESENT INVENTION

This need is met by the three-dimensional position sensing system and method of the present invention wherein the X-Y-Z coordinates of a point can be calculated by triangulation. The triangulation calculation is based on the coordinates of at least three retroreflective elements spaced apart from each other, and the measured angles between the lines projected radially outward from a point located at an actual position of a light transmitting and detecting means to each of the retroreflective elements. One advantage of the present invention is that all of the active elements are in one location that is, at the light transmitting and detecting means, as the retroreflective elements are preferably passive elements.

In accordance with one aspect of the present invention, a system for determining the position of a point in space comprises: at least three stationary retroreflective elements spaced apart from each other and stationed at known coordinates, the retroreflective elements capable of reflecting light back toward a light source; light transmitting and detecting means, positionable at the point, for generating a rotating beam of light to illuminate the stationary retroreflective elements during rotation, and for detecting the beam of light when it is reflected from the stationary retroreflective elements and generating an output signal in response thereto; and computer means responsive to the output signal for computing, from the known coordinates of the retroreflective elements and from the angular orientation of the beam when the beam illuminates the retroreflective elements, the coordinates of the position of the point in space.

In a preferred embodiment of the system, the light transmitting and detecting means comprises: means for generating a beam of light; means for projecting the beam of light at a substantially constant rotating angular velocity toward the retroreflective elements; means for receiving the beam of light reflected from the retroreflective elements corresponding to the illumination of the retroreflective elements during rotation of the beam; and azimuth and zenith means, responsive to reflection of the beam of light from the retroreflective elements, for continuously transmitting angle signals indicative of an azimuth and zenith angle at which the means for receiving the beam of light is positioned with respect to each of the retroreflective elements.

In accordance with one aspect of the system for determining the position of a point, the stationary retroreflective elements have a distinctive retroreflective design, such as a slant target extending substantially diagonally from one top corner to the opposing bottom corner of the retroreflective elements in combination with a retroreflective bar code. In a structured environment, then, the computer means can designate a number for each retroreflective element in a rotation, and the number will remain the same for each rotation.

In a further aspect of the present invention, the light transmitting and detecting means includes a member rotating with the beam, the member having a periphery and further having a plurality of angularly positioned elements spaced around the periphery which divide a revolution of the member into a plurality of generally equal partial revolutions; and a means for detecting movement of each of the elements past a predetermined point as the member rotates. Preferably, the plurality of angularly positioned elements comprises a plurality of apertures and the means for detecting movement of each of the elements comprises a light source paired with a photodetector element. A further preferred embodiment includes means for registering a tilt position of one or more reflecting mirrors and means for calculating a zenith angle of the beam 16 based on the tilt of each of the mirrors.

The present invention also provides a method for determining the position of a point in space. The method comprises the steps of: locating at least three stationary retroreflective elements spaced apart from each other and stationed at known coordinates, the retroreflective elements capable of reflecting light back toward a light source; transmitting a rotating beam of light to illuminate the stationary retroreflective elements during rotation; calculating an angle between the direction of the beam of light when the beam illuminates each of the retroreflective elements; tracking scan behavior; using the scan behavior to calculate angular measurements; and determining the position of the point based on the angular measurements and the coordinates of the retroreflective elements.

In a preferred embodiment of the method for determining the position of the point, the step of tracking scan behavior further includes the steps of mounting a member on a rotating shaft, the member having a periphery and further having a plurality of apertures located at the periphery which divide a revolution of the member into a plurality of generally equal partial revolutions; and registering a time differential between each adjacent pair of the plurality of apertures as the member rotates. Also, the method includes the step of interpolating between corresponding angle measurements of an adjacent pair of the plurality of apertures to determine exact angles between each pair of apertures.

In a further embodiment, the step of tracking the scan behavior includes not only the determination of the X-Y position of the point, as described above, but also the determination of the Z position of the point. This can be accomplished by registering the tilt position of one or more reflecting mirrors and calculating the zenith angle of the exit beam based on the registered mirror Position.

Accordingly, it is an object of this invention to provide a position sensing system and method, wherein the X-Y-Z coordinates of a point can be calculated by triangulation. It is also an object of this invention to provide such a system and method wherein the orientation of the system when it is located at the point can be determined. It is a further object of this invention to provide such a system wherein the calculations are insensitive to deviations in the rotational velocity of the rotating light beam. Finally, it is an object of this invention to provide such a system which utilizes software to calibrate a code wheel or other member to improve the accuracy of the calculations.

Other objects and advantages of the invention will be apparent from the following description, the accompanying drawings and the appended claims.

BRIEF DESCRIPTION OF THE DRAWINGS

FIG. 5 is a schematic block diagram of a hardware interface, controlled by software, which supports the Position sensing system of the present invention, illustrating the interrelationship between the retroreflective elements shown in FIG. 1 and the light transmitting and detecting means shown in FIG. 2; and FIGS. 6A and 6B illustrate a flow chart detailing the steps used in determining the Z-position of the point in space shown in FIG. 1.

DETAILED DESCRIPTION OF THE PREFERRED EMBODIMENT

Figure 1:
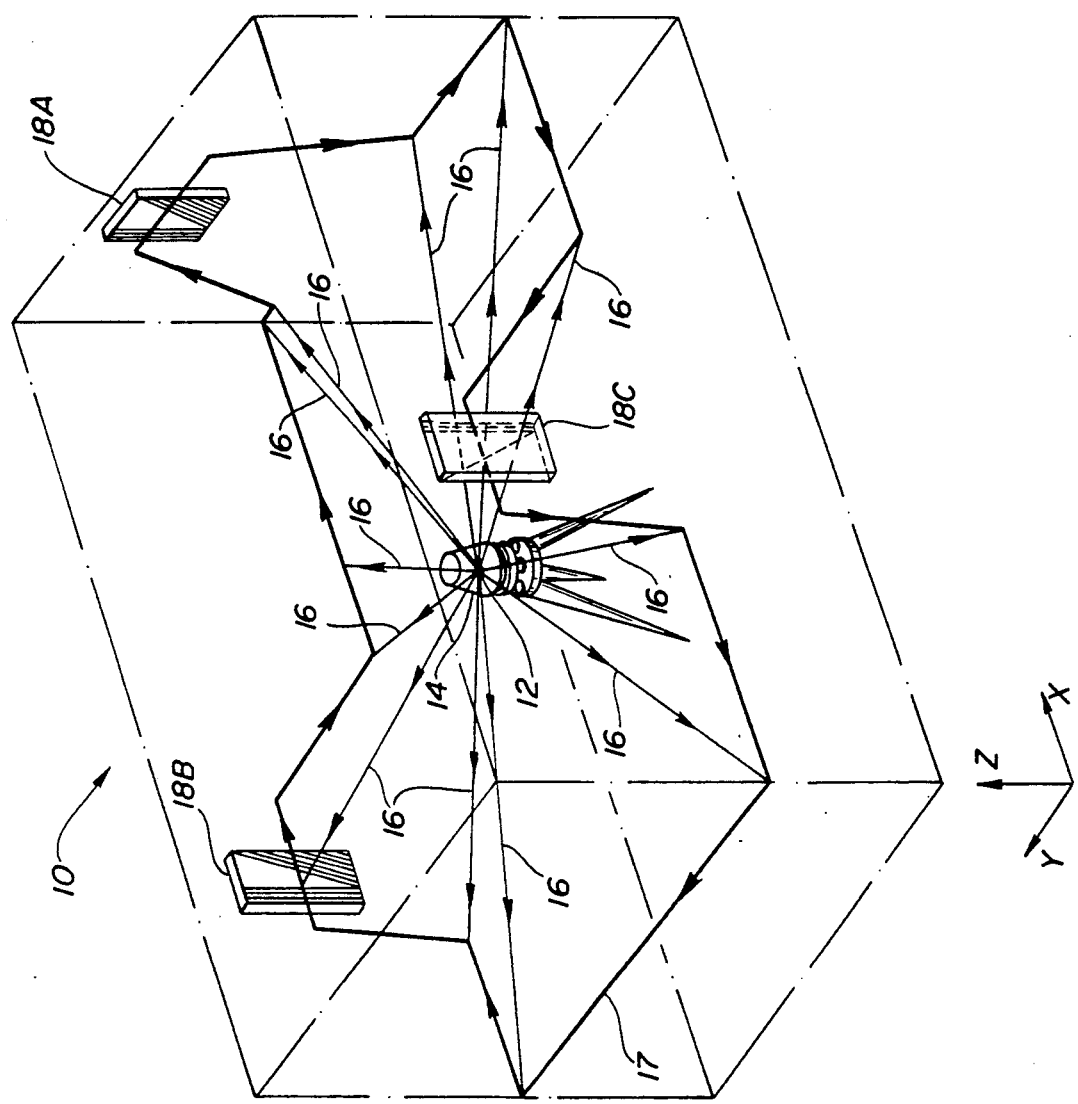
FIG. 1 is an isometric view of the position sensing system of the present invention located at a point within a structured environment defined by four intersecting walls.
Figure 2:
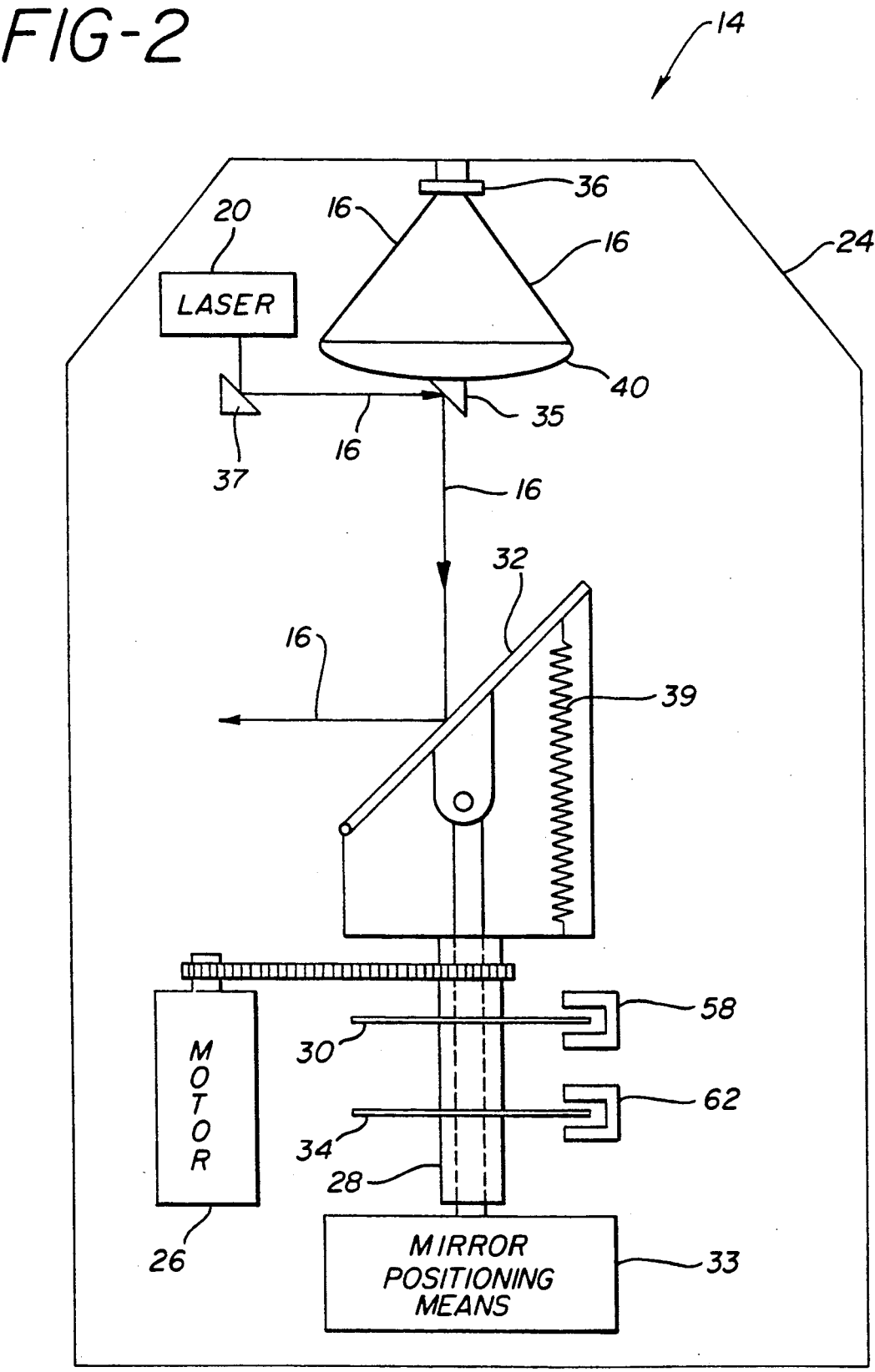
FIG. 2 is a side view, with parts broken away, of a light transmitting and detecting means of the position sensing system of FIG. 1.

The three-dimensional position sensing system and method of the present invention is advantageously utilized in either a structured environment 10, as shown in FIG. 1, or an external environment, to generate constantly updated information on the exact location of a point 12. Typically, light transmitting and detecting means 14, best illustrated in FIG. 2, is positioned at the point 12 for transmitting a rotating beam of light 16, which is emitted by a light source such as laser 20 of FIG. 2, and reflected back to the light transmitting and detecting means 14 by a series of retroreflective elements 18. The position sensing system is also capable of determining the orientation of the light transmitting and detecting means 14 which is positioned at the point 12. The rotating beam of light 16 should be of a size appropriate to create discernible START signals and END signals from each of the retroreflective elements 18, which preferably consist of distinctive retroreflective bar code elements in the form of a diagonal slant target from a top corner of the retroreflective element 18 to the opposing bottom corner in combination with a retroreflective bar code, as illustrated in FIGS. 1 and 5.

The position sensing system has at least three stationary retroreflective elements 18, as typified by elements 18a, 18b, and 18c in FIG. 1. Preferably, the retroreflective elements 18a, 18b, and 18c are spaced apart from each other around the periphery of the frame of reference and stationed at known coordinates in the frame of reference 10. In a preferred embodiment of the present invention, the retroreflective elements 18 are passive sensors, although active sensors may be used as well. With the passive sensor elements 18, the beam of light 16 is reflected back to the light transmitting and detecting means 14. The beam 16 transmitted by the light transmitting and detecting means 14 has a varying zenith angle such that a dynamic scan pattern 17 of the beam 16 can scan the environment 10 at varying elevations to strike the retroreflective elements 18, regardless of the elevation of the elements 18. Azimuth and zenith means (not shown), responsive to the reflection of the beam of light 16 from the retroreflective elements 18, continuously transmit angle signals, indicative of an azimuth and zenith angle at which the light transmitting and detecting means for receiving the beam of light is positioned with respect to each of the retroreflective elements 18, to a computer 22 of FIG. 5. The computer 22 includes a microprocessor, such as a Motorola 68030, having memory means for providing storage of software and data. A listing of exemplary software for performing the angle measurements in accordance with the present invention is included following the detailed description.

Since the reflection from one passive element 18 looks the same as the reflection from each of the other passive elements 18, it cannot be determined from the reflection itself which element 18 is being illuminated. Therefore, according to one aspect of the present invention, any or all of the retroreflective elements 18a, 18b, and 18c can have a unique bar code in order to differentiate one element from the others. The moment of illumination of each retroreflective element 18 is registered extremely accurately since that moment is decisive for determining the angle within the angle of rotation of 360 degrees. By recognizing the retroreflective elements 18a, 18b, and 18c individually, it is possible to assign the proper coordinates to each element 18, which is necessary for the calculation of the position of the point and the determination of the orientation of the light transmitting and detecting means 14 located at the point 12. Assigning a unique bar code to each element 18 distinguishes each of the elements 18a, 18b, and 18c from the others. The computer 22 includes a microprocessor, such as a Motorola 68030, having memory means for providing storage of software and data. A listing of exemplary software for performing the bar code recognition of the present invention is included following the detailed description.

Figure 6B:
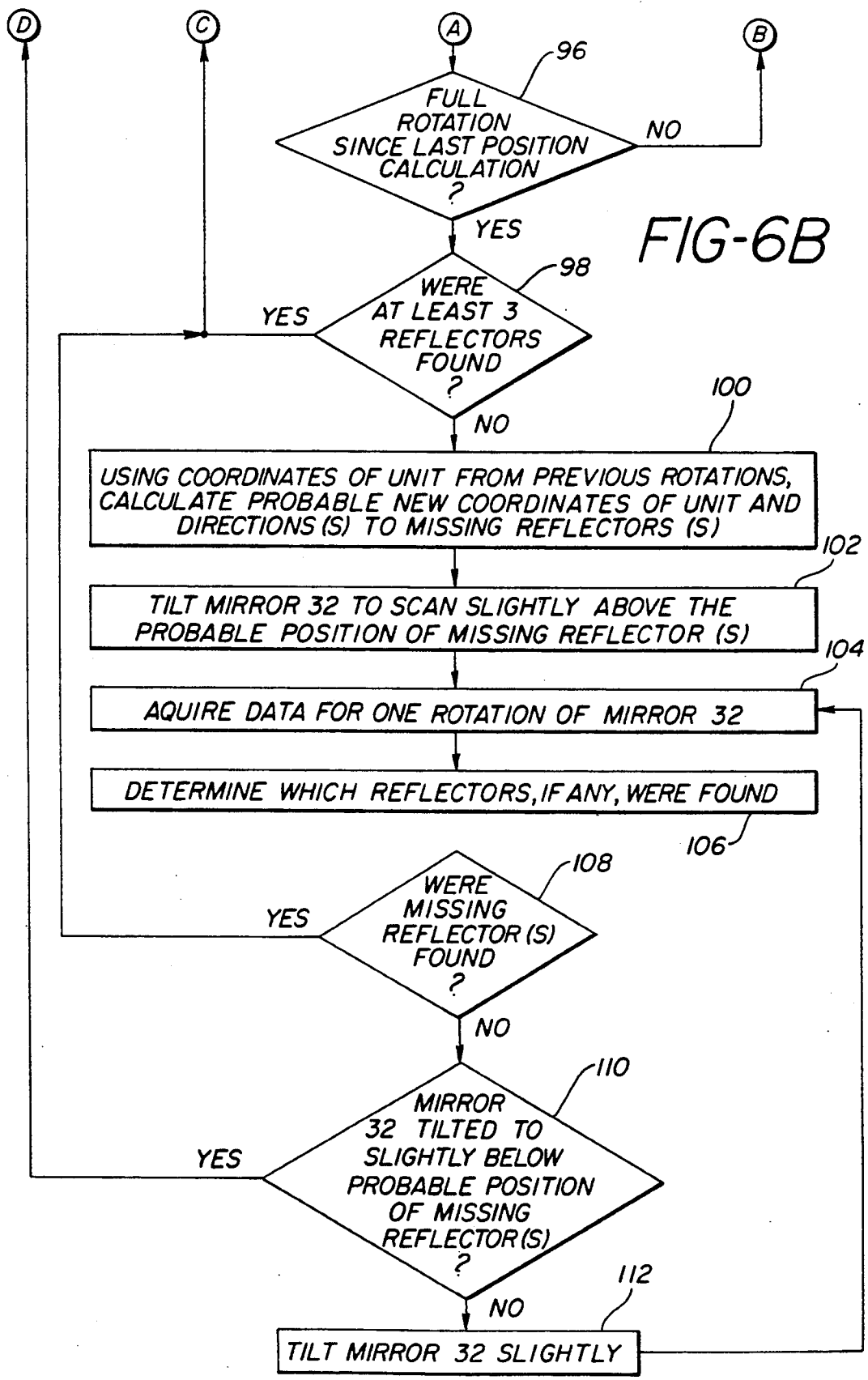

Using the angle measurements and the recognized bar code patterns, the X-Y coordinates of the point 12 can be calculated by triangulation, and the Z coordinate is determined in accord with the flow chart of FIGS. 6A and 6B. The computer 22 includes a microprocessor, such as a Motorola 68030, having memory means for providing storage of software and data. A listing of exemplary software for performing the triangulation calculations of the present invention is included following the detailed description.

Referring now to FIG. 2, a side view of a housing 24 for the light transmitting and detecting means 14 is shown. The light transmitting and detecting means 14 includes an electric motor 26 mounted to rotate shaft 28. A member 30, such as a code wheel, and a light diverting mirror 32 are mounted on the shaft 28. A mirror positioning means 33 provides movement or positioning of the mirror 32. The tilt of the mirror 32 is known for a current position of the member 30 such that the vertical height of the retroreflective elements 18 are always known with respect to any horizontal point.

In the present invention, the beam 16 has a variable zenith angle, which can be varied by changing the position of one or more mirrors 32, 35, and 37, shown in FIG. 2. For instance, the main mirror 32 can be tilted using spring 39 which cooperates with the mirror positioning means 33. Alternatively, mirror 35 can be tilted in two dimensions in order to properly project beam 16 onto mirror 32. Yet another means for varying the zenith angle of the beam 16 is to tilt mirror 37 independently or in conjunction with mirror 35. Mirror 37 is optional, however, as the laser 20 may direct beam 16 straight at mirror 35.

An index wheel 34 can also be included for providing a single reference pulse indicating each complete rotation of the shaft 28. A light source, such as solid state laser 20, directs the beam of light 16 onto the rotating mirror 32 so that a plane of rotation is created. In a preferred embodiment of the invention, a generally horizontal plane of rotation is created. However, any plane of rotation, including vertical, can be created. In addition, the beam 16 has a zenith angle which may be varied to produce a non-planar scan pattern. The retroreflective elements 18 are positioned in this plane or scan pattern. An advantage of the present invention is that a precisely horizontal or vertical plane or scan pattern is not essential for the three dimensional position calculation. As a result, the system may be used either by an operator as a handheld device as the operator moves about the environment of interest, or mounted on vehicles and other equipment as the equipment moves about a given area.

When the rotating laser beam 16 strikes the retroreflective elements 18 during each revolution of the shaft 28, the beam of light 16 is reflected back to the light transmitting and detecting means 14 and can be transformed into an analog signal by a suitable detector, such as photodetector 36, and transmitted to a signal processing means 38 of FIG. 5, which outputs two digital signals.

Theoretically, the moment in time that a retroreflective element 18 has been illuminated with respect to the complete time of rotation is related to its angle, depending on which retroreflective element 18 is being illuminated by the light beam 16, within a total angle of 360 degrees. However, this is only the case if the rotational speed of the beam 16 is extremely constant. Typically, the rotational speed of motor shaft 28 which causes the beam 16 to rotate is not perfectly constant and it is not possible to obtain a constant speed with the accuracy which is desired by the position sensing system of the present invention, especially in a mobile operation. Consequently, the position sensing system utilizes the motor 26 in conjunction with the member 30, supported by the dedicated hardware interface of FIG. 5 and controlled by software to achieve the desired accuracy. The computer 22, having a microprocessor such as a Motorola 68030, contains software for a main routine which controls the hardware interface of the position sensing system, an exemplary listing of which is included following the detailed description.

Figure 3:
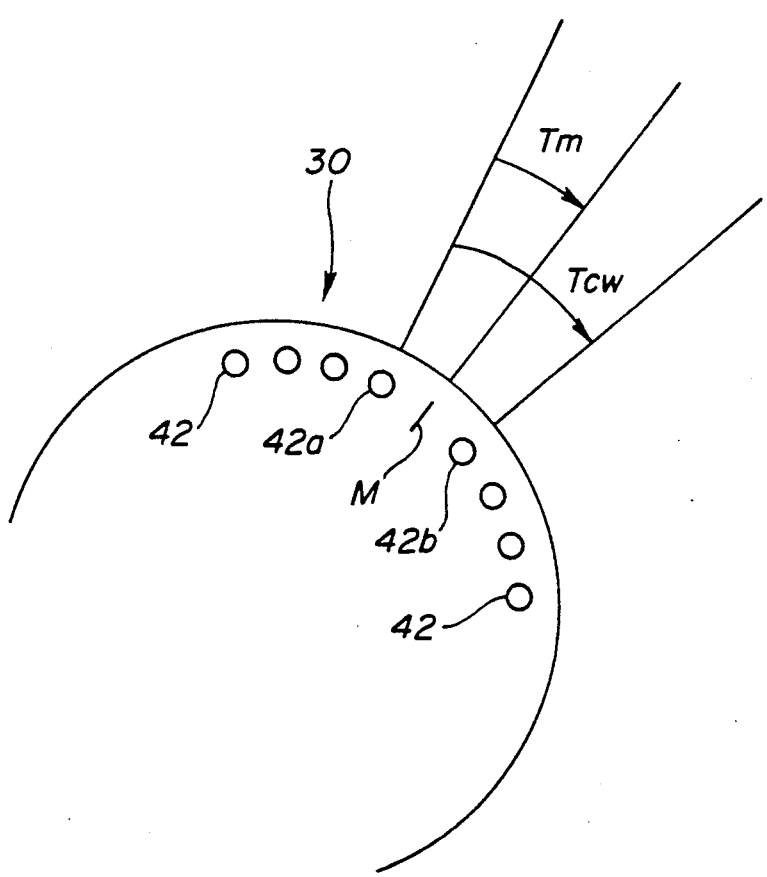
FIG. 3 is an exploded partial top view of a rotating member illustrated in FIG. 2.

As shown in FIG. 3, the member or code wheel 30 has a plurality of angularly positioned elements, preferably apertures 42, spaced around its periphery which divide a revolution of the member 30 into a plurality of generally equal partial revolutions. The size and spacing of these apertures are greatly exaggerated in the drawing for clarity of illustration. For example, the code wheel 30 may divide a revolution into one thousand generally equal parts positioned approximately 0.36 degrees apart by spacing one thousand elements or apertures 42 around the periphery of the member 30. Although the distance between each adjacent pair of apertures 42 theoretically represents a movement of 0.36 degrees, misalignment of the member 30, misalignment of the center of the member 30 through which the shaft 28 extends, and manufacturing tolerances, cause deviations in the spacing of the elements 42. However, since these deviations remain constant once the light transmitting and detecting means 14 is assembled, the actual angular spacing between each element 42 in the member 30 can be determined extremely precisely by a software calibration table.

Calibration of the code wheel or member 30, preferably using software, improves accuracy by eliminating errors due to misalignments, deviations, and irregularities of the rotational speed of the motor 26. Any speed fluctuation of the motor 26 between two apertures 42, particularly when there are one thousand such apertures spaced around the periphery of the member 30, will be negligible. Consequently, it is possible to interpolate between an adjacent pair of apertures, such as 42a and 42b in FIG. 3, to determine an exact angle between the pair of apertures 42a and 42b, according to the equation:

$$Angle = \angle 42a + (Tm/Tcw) * (\angle 42b - \angle 42a)$$

where $\angle 42a$ is the measured angle of aperture 42a; $\angle 42b$ is the measured angle of aperture 42b; Tm is the time elapsed between passage of the previous aperture, here aperture 42a, and the moment M in time that the reflecting light strikes the sensor or photodetector 36; and Tcw is the time it takes the code wheel 30 to move between element 42a and element 42b.

Figure 4:
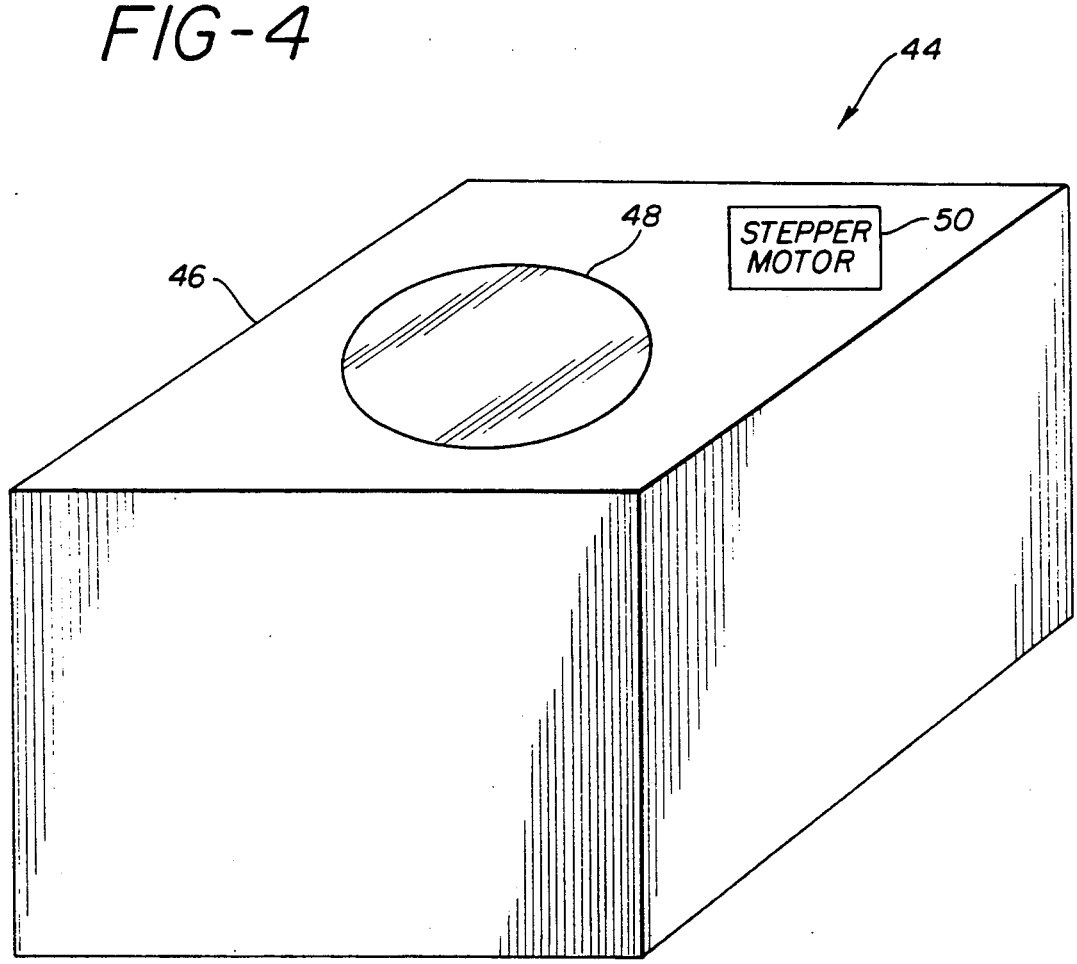
FIG. 4 is a calibrating system which is used in conjunction with related software to calibrate the light transmitting and detecting means of FIG. 2 which includes the member of FIG. 3.

One method of calibrating the code wheel or member 30 is illustrated in FIG. 4 as a calibration system 44. To calibrate the member 30, the light transmitting and detecting means 14 containing the code wheel 30, is placed on a device 46 having an angularly positioned rotating surface 48 such that the spin axis of shaft 28 containing code wheel 30 is concentric to surface 48 of device 46, with the member 30 arbitrarily positioned. The computer 22 of FIG. 5 controls a stepper motor 50 associated with the surface 48 and determines the number of steps between each pair of adjacent elements 42 as the member 30 rotates. For instance, if one revolution of the member is defined as 360,000 steps, and the member 30 contains 1000 generally equally spaced elements 42, then each step would theoretically be expected to be equal to 0.001 degree, and each element 42 would be 0.36 degrees or 360 steps from each adjacent element 42. However, in reality, there will be deviations in the spacing of the elements 42. Therefore, the actual spacing between each adjacent pair of elements 42 is measured and can be stored in a calibration table, which table will remain accurate as long as the position sensing system of the present invention remains assembled.

Initially, in calibrating the member 30, a first element 42 receives a signal from a reference retroreflective element, and this first element 42 becomes an index element for purposes of calibration of the member 30. The calibration system 44 determines when the index and following elements 42 are in position to commence or end the counting of the steps between elements 42 by employing the interpolation equation from above. For the index element 42, Tcw equals zero and Tm equals zero. As the member 30 rotates toward the next adjacent element 42, Tm approaches zero and Tcw approaches 1. The moment in time when Tm is equal to zero and Tcw is equal to one, then the element 42 is in position to end the counting of steps between the index element and the first adjacent element. This pattern continues until the number of steps and, thus, the distance in degrees between, each pair of adjacent elements 42 has been determined. The calibrating system 44 is associated with the computer 22 which includes a microprocessor, such as a Motorola 68030, having a memory means for providing storage of software and data. A listing of exemplary software for performing the calibration of the light transmitting and detecting means 14 which includes the member 30 of the present invention is included following the detailed description.

The position sensing system which combines the use of the code wheel 30 and the motor 26 is supported by a hardware interface 52, illustrated in FIG. 5. An event occurs every time an aperture 42 on the code wheel 30 passes, or a retroreflective element 18 commences or ends a reflection of the beam of light 16. Due to the high precision time measurements required between each adjacent pair of apertures 42, a reference clock 54 is used in keeping a record of an event. If an event occurred during this time, it is stored in a circuit 56, such as a 32 bit first-in-first-out circuit. The circuit 56 records the movement of the code wheel 30 at register 0. The actual element or aperture 42 which is currently passing is sensed at a member or code wheel pick up element 58 and counted by a member rotation counter 60. Each time the member 30 has completed a full rotation, an index pick up element 62 sends a signal to reset the member rotation counter 60. The member pick up element 58 and the index pick up element 62 comprise means for detecting movement of each of the elements 42 past a predetermined point as the member 30 rotates. In a preferred embodiment of the present invention, the pick up elements 58 and 62 comprise a light source paired with a photodetector element.

The light transmitting and detecting means 14 may include means for diverting and focusing the returning beam to the photodetector 36. The rotating mirror 32 diverts the light beam 16 toward a collimating lens 40, which lens 40 focuses the light beam 16 toward the photodetector 36. Signal processing means 38 detect when receiving optics 64, consisting of collimating lens 40 and photodetector 36, is either commencing receipt of the reflection of the light beam 16 or ending receipt of the reflection of the light beam 16 from the retroreflective elements 18 to the light transmitting and detecting means 14 of FIG. 2. Signal processing means 38 can transform the analog signal 41 from photodetector 36 into two digital signals which are received at register 1 of circuit 56. The first digital signal represents a START signal which indicates if the reflection from retroreflective element 18 is commencing the reflection of beam 16 from the retroreflective elements 18 to the light transmitting and detecting means 14, and the second digital signal is an END signal which indicates if the reflection is ending. Register 2 receives signals for measuring the time elapsing between the passage of the last aperture 42 and an event, which event may be the time Tm or the time Tcw shown in FIG. 3. A clock pulse counter 66 is reset at a clock pulse for counter 60 for each aperture 42, which counter 66 counts the time elapsing between the passage of each pair of adjacent elements 42. Information regarding the capacity of the circuit 56 is stored in register 3.

The circuit 56 stores the information received and provides an output signal 68 to the computer 22 which includes a microprocessor having memory means. The computer 22 is responsive to the output signal 68, to compute the coordinates of the position of the point 12 in the frame of reference 10. When the light transmitting and detecting means 14 is positioned at point 12, the computer 22 also computes the orientation of the light transmitting and detecting means 14 within the frame of reference 10.

FIG. 5 also illustrates the variable zenith angle of the beam which results from the tilt of any of the mirrors 32, 35, and 37 of FIG. 2. Varying the zenith angle of the beam 16 allows the position sensing system to scan an environment 10 and find all of the retroreflective elements 18 even when the elements 18 are not positioned at equal elevations. Referring back to FIG. 1, the dynamic scan pattern 17 can be tilted up or down as the beam 16 approaches a retroreflective element 18 to permit the beam 16 to strike the retroreflective element 18.

Referring now to FIGS. 6A and 6B, a flow chart illustrating the steps for positioning or tilting a mirror and providing feedback regarding the Z position of the point 12 of FIG. 1 is shown. Mirror 32 is used here by way of example and is not intended to be limiting, as any or all of the mirrors 32, 35, and 37 may be tilted to vary the zenith angle of the beam 16. This information is then used for computing the X-Y-Z coordinates of the point 12. The flow chart is triggered in FIG. 6A by the main routine software at step 70. Next, steps 72 and 74 require tilting the mirror 32 of FIG. 2 to its upper limit and acquiring data relating to the position of the mirror 32 as the shaft 28 rotates the mirror 32 through one rotation. At step 76, the program determines which, if any, reflectors were found during the rotation of the mirror 32 as the mirror 32 was tilted to its upper limit. The exemplary software for performing angle measurements and bar code recognition may be applied to the program at this point.

Continuing with FIG. 6A, decision block 78 determines whether the mirror has been tilted sufficiently to reach its lower limit of range. If not, the mirror 32 is tilted slightly at block 80. If the mirror 32 has been tilted through its full range, the current X-Y position of the point 12 is computed at block 82. The exemplary software for performing the triangulation calculations may be applied here before continuing to step 84 where the elevation of the beam 16 striking the retroreflective elements 18 is calculated. The elevation can be determined using the known retroreflective element locations and the dark/light ratio reflection from the distinctive slant targets extending substantially diagonally from one top corner to the opposing bottom corner of the retroreflective elements 18 in combination with a retroreflective bar code.

The program continues to step 86 where an equation for the plane which intersects the beam 16 is generated. At step 88, then, the program calculates the elevation of the plane at the current X-Y position computed at step 82. Using the elevation of the plane at the current X-Y position and the known tilt angle of the mirror 32 when the beam 16 strikes the retroreflective elements 18, a Z position is calculated at step 90. Then using the coordinates from previous rotations from steps 82 and 90, the mirror is tilted into the correct position for striking the next retroreflective element 18 at step 92.

At step 94, using the exemplary angle measurement software and bar code recognition software, the bar code and angle of the next retroreflective element to be struck by the beam 16 are read. Decision block 96 of FIG. 6B then determines if a full rotation has occurred since the last position calculation. If not, the program returns to step 92. If so, the program continues to decision block 98 to determine if at least three retroreflective elements 18 were found. If so, the program returns to step 82. If not, the program continues to block 100 to calculate the probable new coordinates of the point 12 and establishes directions to the missing retroreflective elements 18, using coordinates of the point 12 from previous rotations.

Once the directions to the missing retroreflective elements 18 have been calculated, the program continues to step 102 where the mirror 32 is tilted to scan slightly above the probable position of the missing retroreflective elements 18. Data is then acquired for one rotation of the mirror 32 at step 104, after which the program determines at step 106 which, if any, of the missing retroreflective elements 18 were found. If the missing retroreflective elements 18 were found, decision block 108 directs the program to step 82. If the missing retroreflective elements 18 were not found, the program continues to decision block 110 to determine if the mirror 32 was tilted to a position slightly below the missing retroreflective elements 18. If so, the program returns to step 72 and repeats. If not, the program continues to step 112 where the mirror 32 is tilted slightly before returning to step 104 and again acquiring data for one rotation of the mirror. Using the steps detailed in the flow chart of FIGS. 6A and 6B, the movement and position of the mirror 32 can be determined and applied to the X-Y-Z calculation of the point 12.

Having described the invention in detail and by way of reference to preferred embodiments thereof, it will be apparent that modifications and variations are possible without departing from the scope of the invention defined in the appended claims.

```
GetAngles()
{
struct trans *t;
struct angle *a;
register int ia, na, itr, isensor;

itr     = 0;
        t       = T;

while( itr < Ntrans ) {
                if( isensor=RefWndw(t) ) {
                        if( (isensor>0) && (isensor<MAX_SENSOR) ) {
                                Aave[isensor]   += ARef(t);
                                Nave[isensor]   += 1;
                                itr     += 8; t += 8;
                        }
                }
        }
```

```
                else {
                        itr++; t++;
                }
        }
/*
        if( (Ticks-Pticks) < 200 )      return(1);
        Pticks  = Ticks;
*/
        a               = A;
        a->a            = M_2PI;
        a->isensor      = 0;
        na              = 1;
        a++;

for( ia=1; ia<MAX_ANGLE; ia++ ) {
                if( Nave[ia] ) {
                        a->isensor      = ia;
                        a->a            = Aave[ia]/Nave[ia];
                        a++; na++;
                }
                Aave[ia]        = 0.0;
                Nave[ia]        = 0;
        } if( RqAngle == -1 ) {
                for( ia=0; ia<na; ia++ ) copA[ia] = A[ia];
                RqAngle = na;
        } return( na );
}

GetTrans()
{
struct event *e;
struct trans *t;

register int i, ntr, iev;
register int icw, stime, ctime;

ntr     = 0;
        iev     = 0;
        e       = E;
        t       = T;

while( iev<Nevent ) {
                if( !(e->icw&CW) ) {
                        e++; iev++;
                }
                else {
                        icw     = e->icw&CWHL_MASK;
                        stime   = e->time&TIME_MASK;
                        ctime   = Tcw( icw+1 );
                        t->a    = Cangle[icw] + CwInter(stime);
                        if( !(e->icw&R_START) ) t->type = R_START;
                        else
                        if( !(e->icw&R_END) )   t->type = R_END;
                        else                    t->type = -1;

e++; iev++;
                        t++; ntr++;
                }
        } if( RqTrans == -1 ) {
                for( i=0; i<ntr; i++ ) copT[i] = T[i];
                RqTrans = ntr;
                if( RqTrans == 0 ) {
                        RqAngle = 0;
                }
        } return( ntr );
}
```

```
GetEvent()
{
register int i;

if( RqEvent == -1 ) {
                for( i=0; i<Nevent; i++ ) copE[i] = E[i];
                RqEvent = Nevent;
                if( RqEvent == 0 ) {
                        RqTrans = 0;
                        RqAngle = 0;
                }
        } return( Nevent );
}

Intr()
{ int fifo;
register int i, icw;
register struct st  *s = SF;

do {
                if( (Nevent>1023) || !(s->status&FULL) ) {
                        printf("Reset Fifo!!!\n");
                        FifoReset();
                } fifo    = s->data;
                icw = fifo & CWHL_MASK;
                if( !icw ) {
                        if( EnTime )    Stime(0);
                        GetPos( &CP );
                        pe      = E;
                        Nevent  = 0;
                }
                else {
                        *pe++ = *(struct event *)(&fifo);
                        Nevent++;
                }
        }
        while( s->status&EMPTY );
}
static float ARef( t )
struct trans t[];
{
float   a;

a = (t[0].a + t[7].a) / 2.0;

return( a );
}
Tcw( icw )
register int icw;
{
register int i, xcw;

for( i=0; i<Nevent; i++ ) {
                if( E[i].icw&CW )       continue;
                xcw = E[i].icw&CWHL_MASK;
                if( xcw == icw )        return( E[i].time&TIME_MASK );
        }
        return(-1);
}

FifoReset()
{
register int i;
register struct st *s = SF;

Nevent  = 0;
        Ntrans  = 0;
        Nangle  = 0;
        RqEvent = 0;
```

```
                RqTrans = 0;
                RqAngle = 0;
                pe      = E;
                Pticks  = Ticks;
                i       = s->reset;

for( i=0; i<MAX_ANGLE; i++ ) {
                        Aave[i] = 0.0;
                        Nave[i] = 0;
                }
} static float BarPos[] = { 0.16, 0.23, 0.29, 0.35, 0.41,
                          0.47, 0.53, 0.59, 0.65 };

RefWndw( t )
struct trans t[];
{
float diff, tdiff;
register int i, itr;
float as, ae, a0, a1;

if( !(t[0].type&R_START) )      return(0);
        tdiff = t[0].a - t[7].a;
        if( tdiff > 0.114 )             return(0);
        if( !(t[1].type&R_END) )        return(0);
        if( !(t[2].type&R_START) )      return(0);

if( !(t[3].type&R_END) )        return(0);

if( !(t[4].type&R_START) )      return(0);
        if( !(t[5].type&R_END) )        return(0);

if( !(t[6].type&R_START) )      return(0);
        if( !(t[7].type&R_END) )        return(0);

tdiff = 1.0 / tdiff;
        as    = (t[0].a-t[2].a) * tdiff;
        ae    = (t[5].a-t[7].a) * tdiff;

if( (as<0.12) || (as>0.18) )    return(0);
        if( (ae<0.12) || (ae>0.18) )    return(0);

tdiff = 1.00 / (t[2].a-t[5].a);
        diff  = (t[2].a - (t[3].a+t[4].a)/2.0) * tdiff;

for( i=1; i<9; i++ ) {
                if( (diff>BarPos[i-1]) && (diff<BarPos[i]) )    return(i);
        }
        return(0);
} static float ARef( t )
struct trans t[];
{
float   a;

a = (t[0].a + t[7].a) / 2.0;

return( a );
}
Icw( icw )
register int icw;
{
register int i, xcw;

for( i=0; i<Nevent; i++ ) {
                if( E[i].icw&CW )       continue;
                xcw = E[i].icw&CWHL_MASK;
                if( xcw == icw )        return( E[i].time&TIME_MASK );
        }
        return(-1);
}
```

```c
#include        "cap.h"

#define CwInter(x)      (x*(Cangle[icw+1]-Cangle[icw])/ ctime);

float ARef();

int Nevent, Ntrans, Nangle;
static int RqEvent, RqTrans, RqAngle;

struct event    E[MAX_EVENT],   copE[MAX_EVENT];
struct trans    T[MAX_TRANS],   copT[MAX_TRANS];
struct angle    A[MAX_ANGLE],   copA[MAX_ANGLE];

struct event    *pe;
struct Co       *Sp;

static  int     Pticks, Nave[MAX_ANGLE];
static  float   Aave[MAX_ANGLE];

struct  CurPos CP;
float x[MAX_ANGLE], y[MAX_ANGLE];

static float BarPos[] = { 0.16, 0.23, 0.29, 0.35, 0.41,
                          0.47, 0.53, 0.59, 0.65 };

GetPos( cp )
register struct CurPos *cp;
{
struct Co P;
struct Mc m1, m2;
register int i, sr, ipref;
float xpref, ypref, alfa;
register struct angle *p1, *p2;

Nevent  = GetEvent();
        Ntrans  = GetTrans();
        Nangle  = GetAngles();

if( Nangle < 4 )        return( 0 );

if( EnTime )    NxtTime();

p1      = &A[1];
        p2      = &A[2];
        m_coord( p1->isensor, p2->isensor, p2->a-p1->a, &m2 );
        p1++; p2++;
        ipref = Ppref( M_PI_2, 0 );

for( i=1; i<Nangle-2; i++, p1++, p2++ ) {
                m1      = m2;
                m_coord( p1->isensor, p2->isensor, p2->a-p1->a, &m2 );
                alfa    = sq( &m1, &m2, p1->isensor, &P );
                ipref   = Ppref( alfa, i );
                x[i]    = P.x;  y[i]    = P.y;
        }
                cp->ipref       = ipref;
                cp->x           = x[ipref];
                cp->y           = y[ipref];
                cp->angle       = CapAngle( cp );
                cp->time        = Ticks;
                cp->nca++;

if( EnTime )    NxtTime();
}
m_coord( sa, sb, alfa, mc )
register int sa, sb;
float alfa;
struct Mc *mc;
{
float dx, dy;
float sinalfa, alfa2, k, beta, teta;

dx = S[sb].x - S[sa].x;
        dy = S[sb].y - S[sa].y;
```

```
        k = sqrt( dx * dx  +  dy * dy);
        if( sinalfa=sin(alfa) ) mc->r = 0.5 * k / sinalfa;
        else                    mc->r = 0.0;

beta = xatan( dx, dy );
        alfa2= M_PI_2 - alfa;
        teta = alfa2 + beta;

mc->x = S[sa].x + mc->r * cos(teta);
        mc->y = S[sa].y + mc->r * sin(teta);
} float sq( m1, m2, sm, P )
struct Mc *m1, *m2;
register int sm;
struct Co *P;
{
float x1, y1;
float x2, y2;
float Tx, Ty, Tc, Tr;
float a1, a2;

x1 = m1->x; y1 = m1->y;
        x2 = m2->x; y2 = m2->y;
/*
 (x - x1)^2  +  (y-y1)^2   =   r1^2
 (x - x2)^2  +  (y-y2)^2   =   r2^2 x^2 - 2xx1 + x1^2  +  y^2 -2yy1 + y1^2  =  r1^2
x^2 - 2xx2 + x2^2  +  y^2 -2yy2 + y2^2  =  r2^2
-------------------------------------------------
2xx2 -2xx1 -x2^2 + x1^2  +  2yy2 -2yy1 - y2^2 + y1^2  =  r1^2 - r2^2
*/

Tx = 2.0 * x2 - 2.0 * x1;
        Ty = 2.0 * y2 - 2.0 * y1;
        Tc = -(x2 * x2 ) + (x1 * x1) - (y2 * y2) + (y1 * y1);
        Tr = (m1->r * m1->r) - (m2->r * m2->r );

Tx = -Tx / Ty;
        if( Ty )        Tc = (Tr - Tc ) / Ty;
        else            Tc = 0.0;
/*
x^2 - 2xx1 + x1^2  +  y^2 -2yy1 + y1^2  =  r1^2
x^2 - 2xx1 + x1^2  +  (Tx+Tc)^2 - 2(Tx+Tc)y1 + y1^2 = r1^2
x^2 - 2xx1 + x1^2  +  (Tx^2x +2TxTcx +Tc^2) - 2(Tx+Tc)y1 + y1^2 = r1^
*/

. a = 1.0 + (Tx * Tx );
        b = -2.0*x1 + 2.0 * Tx * Tc   -2.0 * Tx * y1;
        c = x1 * x1  + Tc * Tc   -2.0 * Tc * y1  + y1 * y1;
        c = c - (m1->r * m1->r );

P->x = -b / a  - S[sm].x;
        P->y = Tc + Tx * P->x;

a1 = xatan( m1->x-P->x, m1->y-P->y );
        a2 = xatan( m2->x-P->x, m2->y-P->y );
        return( fabs(a1-a2) );
}
float xatan( dx, dy )
float dx, dy;
{
float x;

if( (dx >=  0.0) && (dy >=  0.0) ) {
             if( dx == 0.0 ) x = M_PI_2;
             else            x = atan( dy / dx );
        }
        else
        if( (dx <  0.0) && (dy >=  0.0) ) {
             x = M_PI - atan( dy / -dx );
        }
        else
        if( (dx <  0.0) && (dy <  0.0) ) {
             x = M_PI + atan( -dy / -dx );
```

```
                }
                else
/*
                if( (dx >= 0.0) && (dy < 0.0) )
*/
                {
                        if( dx == 0.0 ) x = 3*M_PI_2;
                        else            x = 2*M_PI - atan( -dy / dx );
                }
                return( x );
} float CapAngle( cp )
struct CurPos *cp;
{ float dx, dy, a;
register int ipret, i;
register struct Co *s;

ipret = cp->ipret;
        i = A[ipret].isensor;
        s = Sp + i;
        dx = s->x - cp->x;
        dy = s->y - cp->y;
        a = xatan( dx, dy ) - A[ipret].a - A_INDEX;
        if( a > M_2PI ) a -= M_2PI;
        if( a < 0.0   ) a += M_2PI;
        return( a );
}
Ppret( alfa, i )
float alfa;
register int i;
{
float temp;
static int ipret;
static float Apret;

if( !i ) {
                ipret = i;
                Apret = alfa;
                return(i);
        }
        if( alfa < 0.0 )        return(ipret);
        while( alfa > M_2PI )   alfa -= M_2PI;
        if( alfa < 0.0 )        return(ipret);
        while( alfa > M_PI )    alfa = M_2PI - alfa;

temp=fabs(alfa-M_PI_2);
        if( temp < Apret ) {
                ipret = i;
                Apret = temp;
        }
        return( ipret );
} include         <stdio.h>
include         <setjmp.h>
#include         <math.h>
#include         "cap.h"

jmp_buf env_ctrlc;
static int SwFlags;
int Ndrws, DspClaim;
int PTicks, PFticks;
int Toggle, Xzoom, MMmode;

float Ralfa;
float x[MAX_ANGLE], y[MAX_ANGLE];

char Line[30], pLine[30];
int Timer(), IntrIndex(), IntrIr();

struct CurPos TmpCp, PrvCp;
char Header[] = "\n**** CAPSY ****\r\n";
char buffer[80], cmd[80], largs[80];
```

```
int Stdin, Stdout;

main()
{
int i;

Stdin = Stdout = 0;

if( !stDef() ) SetDefault( 0, 1 );

gen_coord(0);
        gen_cangle(0);

Ticks    = 0; PTicks    = 0; Toggle    = 0;
        EnTime   = 0; DspClaim  = 1; Xzoom     = 0;
        CP.x     = 0; CP.y      = 0; CP.time   = 0;
        CP.nca   = 0; CP.pnca   = 0; MMmode    = 0;
        CP.angle = 0; Ralfa     = 0;

for(i=0; i<25; Line[i++] = 0 );
        for(i=0; i<25;pLine[i++] = 0 );

I2cInit();
        FifoReset();

SetVector( AVEC6, Timer );
        SetVector( AVEC5, IntrIndex );
        SetVector( AVEC3, IntrIr );
        SetLvl( LVL2 );

Delay( 1.0 );

SetPtty( TERM );
        fprintf( Stdout,  Header );
        fprintf( 0, "Tty to Std#%d.\n", Stdin );
        fprintf( 1, "Tty to Std#%d.\n", Stdin );

open_gfx();

if( setjmp( env_ctrlc ) ) {
                SetPtty( GRAPHICS );
                DrwMob( -Nmob );
                Nmob = Ncoord( Mob, MAX_MOB );
                DrwMark();
        }

SetPtty( GRAPHICS );

DspClaim= 0;
        MMmode  = 0;

TtyControl();
}

TtyControl()
{
register char c;
register int i=0;

do {
                c = fgetc(Stdin);
                if( c & CTRL_CHAR )     CtrlControl( c );
        }
        while( c != '*' );

DspClaim-= 1;
        SetPtty( TERM );

for(;;) {
                fprintf( Stdout, "Enter command:");
                if( !getcmd( cmd, largs ) )   c = 0;
                else                          c = cmd[0];
                fprintf( Stdout, "\n");

AE_cmd( c );
```

```
              switch( c ) { case '2' :
                              DeFault();
                      break;

case '3' :
                              AeCmd();
                      break;

case '4' :
                              SwapTty();
                      break;

case '5' :
                              ManMove();
                              longjmp( env_ctrlc );
                      break;

case '6' :
                              ManScale();
                      break;

case '7' :
                              Update();

case '9' :
                              SetPtty( GRAPHICS );
                              open_gfx();

case  0  :
                      case '0' :
                              longjmp( env_ctrlc );
                      break;

}
      }
}
CtrlControl( c )
register char c;
{
register char c0=c;

DspClaim = 1;

c &= 0x3f;
      switch( c ) { case '*' :
              case '0' :
              case '\r' :
                      ZoomCmd( c );
                      c0 = -1;
              break;

case '1' :
              case '3' :
                      DirectMark( c );
                      SetPtty( GRAPHICS );
                      SwapGfx( Xzoom );
                      c0 = -1;
              break;

case '9' :
                      SetPtty( GRAPHICS );
                      SwapGfx( Xzoom );
                      c0 = -1;
              break;
      }

DspClaim = 0;

return(c0);

}
AeCmd()
{
```

```
                fprintf( Stdout, " 1 = Events\n");
                fprintf( Stdout, " 2 = Angles\n");
                fprintf( Stdout, "Select type : ?");

getcmd( cmd, largs ); fprintf( Stdout, "\n");

if( cmd[0] == '1' )    cmd[0] = 'E';
                if( cmd[0] == '2' )    cmd[0] = 'A';

AE_cmd( cmd[0] );
}
SwapTty()
{
        if( Stdin == 0 ) {
                Stdin = Stdout = 1;
        }
        else
        if( Stdout == 1 ) {
                Stdin = Stdout = 0;
        }
        fprintf( 0, "Tty swap to Std#%d.\n", Stdin );
        fprintf( 1, "Tty swap to Std#%d.\n", Stdin );
}
ManMove()
{
register char c, c0;
register int step;
struct CurPos cp;

SetPtty( GRAPHICS );
        DspClaim= 0;
        MMmode  = 1;

for(;;) {
                cp = CP;
                if( !Xmove(&cp) ) return;
                CP = cp;
        }
}
ManScale()
{
register char c, c0;
register int step;
struct CurPos cp;

SetPtty( GRAPHICS );
        DspClaim= 0;
        MMmode  = 1;
        for(;;) {
                Xmove( &cp );
                CP       = cp;
        }
}
Xmove( cp )
register struct CurPos *cp;
{
register int step;
register char c, c0;

c = c0 = fgetc(Stdin);

step    = 100;
        if( c & CTRL_CHAR ) {
                c = CtrlControl( c );
                c &= 0x3f;
                step *= 5;
        } switch( c ) { case '6' : cp->x +=  step; break;
                case '4' : cp->x += -step; break;
                case '2' : cp->y +=  step; break;
                case '8' : cp->y += -step; break;
```

```
                        case '5' :
                                if( c0&CTRL_CHAR )       cp->angle -= degrad(15.0);
                                else                     cp->angle += degrad(15.0);

while( cp->angle > M_2PI ) cp->angle -= M_2PI;
                                while( cp->angle < 0.0 )   cp->angle += M_2PI;
                        break;

case  0 :
                        case '\n':
                        case '\r':
                                return 0;
                        break;

} cp->nca++;

return  1;
}
ZoomCmd( c )
register char c;
{
        if( c == '*' )  Xzoom--;
        else
        if( c == '\r' ) Xzoom++;
        else
        if( c == '0' )  Xzoom = 0;

if( Xzoom < 0 )         Xzoom = 0;
        if( Xzoom > 10 )        Xzoom = 10;

SwapGtx( Xzoom );
}

DirectMark( c )
register char c;
{
register int i;
struct CurPos cp;

cp = CP;
        if( c == '1' ) {
                DrwMob( -Nmob );
                FrzMob( &cp, Mob, Mrk );
                Nmrk = Ncoord( Mrk, MAX_MRK );
                DrwMark();
        }
        else
        if( c == '3' ) {
                DrwMob( -Nmob );
                for( i=0; i<MAX_MRK; i++ )       Mrk[i].x = Mrk[i].y = -1.0;
                Nmrk = Ncoord( Mrk, MAX_MRK );
                DrwMark();
        }
}
IntrTicks()
{

Ticks++;

if( !DspClaim && (Ticks-PTicks)>=(F_CLOCK/4) ) {
                TmpCp  = CP;
                gfx_point( &TmpCp );
                PTicks = Ticks;
        }
}
gfx_point( cp )
register struct CurPos *cp;
{
register int i;

/* if( (cp->nca==PrvCp.nca) && !MMmode ) { */
```

```
             if( (cp->nca==PrvCp.nca) ) {
                     if( Toggle ^= 1 ) {
                             DrwMob( -Nmob );
                             return;
                     }
             }
             PrvCp = *cp;

cp->angle += Ralfa;
             if( !MMmode )  sprintf( Line, "X:%5.0f  Y:%5.0f  O:%5.1f",
                             cp->x, cp->y, raddeg(cp->angle) );
             else           sprintf( Line, "x:%5.0f  y:%5.0f  O:%5.1f",
                             cp->x, cp->y, raddeg(cp->angle) );
             Line[25] = 0;
             WrLine( Line );
             DrwMob( Nmob, cp, Mob );
}
WrLine( line )
register char *line;
{
register int i, x;
register char *p, *l;

p = pLine; l = line;

while( *l ) {
                if( *l != *p ) {
                        while( *l )    *p++ = *l++;
                        wstring( 6, 119, line );
                        return;
                }
                l++; p++;
        }
} include       <setjmp.h>
        #include       <math.h>
        #include       "cal.h"

#define        NxtA(x)         ((x>=Nangle)?x-Nangle+1:x)

struct Sensor S[MAX_SENSOR+1] = {
                        0,      -1,     -1,
        /*
                        1,      1302,   6100,
                        2,      0,      2397,
                        3,      1077,   0,
                        4,      3080,   4400,
        */
                        1,      0,      0,
                        2,      1000,   0,
                        3,      2000,   0,
                        4,      3000,   0,
                        5,      -1,     -1,
                        6,      -1,     -1,
                        7,      -1,     -1,
                        8,      -1,     -1,
                        9,      -1,     -1,
                        10,     -1,     -1,
                        11,     -1,     -1,
                        12,     -1,     -1,
                        13,     -1,     -1,
                        14,     -1,     -1,
                        15,     -1,     -1,
                        16,     -1,     -1
        };

struct  angle A[MAX_ANGLE];

jmp_buf env_esc, env_ctrlc;

static int SwFlags;
        int SwFlags, Ncalcu;
        int PTicks, PFticks, PNcalcu;
        int Tsteps;
        int Gsteps, Gpatrn;
```

```
            float GetIangle();
            float x[MAX_ANGLE], y[MAX_ANGLE];

int Timer(), IntrIndex(), Trap15();

char *range();
            struct CurPos CP;
            char buffer[80], cmd[80], largs[80];

int Stdin, Stdout;

main()
            {
int key;

llcd("** CALI CAPSY **");

setjmp( env_ctrlc );

gen_cangle(0);
            gen_coord(0);

Stdin   = 0;
            Stdout  = 0;
            Ticks   = 0;  PTicks    = 0;  PFticks   = 0;    Ncalcu  = 0;
            PNcalcu = 0;  Tsteps    = 0;  base      = 10;
            Gsteps  = 0;  Gpatrn    = 0;

I2cInit();
            IniCT();
            FifoReset();

Trap1( LVL6, Timer );
            Trap1( LVL5, IntrIndex );
            Trap1( 0xbc, Trap15 );
            Trap0( 0x0200 );

if( setjmp( env_esc ) ) {
                    EscControl();
            }
            ItyControl();
}
ItyControl()
{
register int i;
register char c, cmd;

printf("\n");
            for(;;) {
                    printf("Cal(%d) :", Tsteps);
                    getcmd( buffer, largs ); printf("\n");
                    cmd = buffer[0];

switch( cmd ) { case 'x' :
                            case 'X' :
                            break;

case 'f' :
                            case 'r' :
                                    FR_cmd( cmd, largs );
                            break;

case 'z' :
                                    printf("Tsteps #%d set to ", Tsteps );
                                    Tsteps = 0;
                                    printf("%d.\n", Tsteps );

break;

case 'c' :
                            case 'C' :
                                    C_cmd( cmd, largs );
                            break;
```

```
                        case 'i' :
                        case 'I' :
                                I_cmd( cmd, largs );
                        break;

case 't' :
                        case 'T' :
                                T_cmd( cmd, largs );
                        break;

case 'S' :
                                S_cmd( cmd, largs );
                        break;

case 'D' :
                        case 'F' :
                                D_cmd( cmd, largs );
                        break;

case 'n' :
                        case 'N' :
                                N_cmd( cmd, largs );
                        break;

case 'G' :
/*
                                gfxcal( Cangle );
*/
                        break;

default :
                                AE_cmd( cmd, largs );
                        break;
                }
        }
}
C_cmd( cmd, largs )
register char cmd, *largs;
{
register int i;
register float *a;
float acal, acap, adif, anul;

Tsteps  = 0;
        a = (float *)0x18000;
        if( cmd == 'C' )        for( i=0; i<1000+1; i++ ) a[i] = -1.0;
        for(;;) {
                acal    = Tsteps/1000.0;
                acap    = GetIangle( 1, 50 );
                printf("%8d : %7.3f", Tsteps, acal );
                if( acap != -1.0 ) {
                        if( cmd == 'C' )        *a      = acap;
                        acap    = raddeg(acap);
                        if( !Tsteps )   anul    = acap;
                        acap -= anul;
                        if( acap < 0.0 )        acap += 360.0;
                        adif    = acap - acal;
                        printf(" -,%7.3f = %7.3f\n", acap, adif );
                }
                else    printf(" *** angle not found ***\n");

if( (Tsteps+360) > 360000 )     break;
                Xstep( 360 );
                a++;
        }

}
I_cmd( cmd, largs )
register char cmd, *largs;
{
register int i;
register float *a;
float as, a0, a1, adif;

a = (float *)0x18000;
```

```
                a1      = a[0];
                as      = a[0];
                for( i=0; i<1000; i++ ) {
                        a0      = a1;
                        a1      = a[i];
                        if( a1 == -1.0 ) {
                                printf("%4d : Not Registered.\n", i);
                        }
                        adif    = a0-a1;
                        printf("%4d : %10.3f(%6.3f) -> %10.3f.",
                                i, raddeg(a1), raddeg(adif), raddeg(as) );
                        adif    = fabs(a0-a1);
                        as      = a1 - a[0];
                        if( (raddeg(adif) < 0.350) || (raddeg(adif)>0.370) ) {
                                printf("!!!!!!!!!");
                        }
                        printf("\n");
                }
}
float GetIangle( ia, naverage )
register int ia, naverage;
{
float atot = 0.0;
register int i, nfound, ntries, na;

nfound = 0;
        ntries = 0;

for(;;) { na = CopAngles();
                for( i=0; i<na; i++ ) {
                        if( copA[i].isensor != ia )     continue;
                        atot += copA[i].a;
                        nfound++;
                        break;
                }
                if( nfound == naverage ) {
                        return( atot/naverage );
                }
                if( ++ntries > 2*naverage )
                        return( -1.0 );
        }
}

EscControl()
{
register char c1, c2;
register int xstep;

c1 = getch(); c2 = getch();

if( c2 == 'O' ) xstep = -1;
        else    if( c2 == 'C' ) xstep =  1;
        else                    xstep =  0;

Xstep( xstep );
}

N_cmd( cmd, largs )
register char cmd, *largs;
{
register int i;
register float *a1 = (float *)0x19000;

if( cmd == 'N' ) {
                for( i=0; i<NCW+1; i++ ) Cangle[i] = *a1++;
                printf("Cal copied to Cangle.\n");
        } if( cmd == 'n' ) {
                gen_cangle(1);
                printf("Cangle initialised.\n");
        }
}
```

```
D_cmd( cmd, largs )
register char cmd, *largs;
{
register int i, icw;
float a, a0, a1, temp;
float step = M_2PI / 1000.0;
register float *ap = (float *)0x18000;
register float *al = (float *)0x19000;

for( i=0; i<1000+1; i++ ) al[i] = -1.0;

for( i=1; i<1000+1; i++ ) {
        a0      = ap[i-1];
        a1      = ap[i];
        if( (a0 == -1.0) || (a1 == -1.0) )      continue;
        temp    = a1/step - 0.5;
        icw     = temp;
        a       = icw * step;
        al[icw] = (i-1) * step + ((a-a0)/(a1-a0)) * step;
        temp    = al[icw];
        if(tstqual('p')) printf("%4d: %8.3f,%8.3f %4d %8.3f  %8.3f\n",
                i,raddeg(a0),raddeg(a1),icw,raddeg(a),raddeg(temp));
} clean_tab( al );

if( cmd == 'F' ) {
        printf("\nfloat Cangle[1000+1] = {");
        for( i=0; i<1000+1; i++ ) {
                if( !(i%8) )    printf("\n");
                temp    = al[i];
                if( i != 1000 ) printf("%9.6f,", temp );
                else            printf("%9.6f ", temp );
        }
        printf("\n};\n");
}
else {
        printf("\nCalibration :");
        for( i=0; i<1000+1; i++ ) {
                if( !(i%5) )    printf("\n %10.3f :", (float)(i*0.360),
                temp    = raddeg(Cangle[i]) - raddeg(al[i]);
                if( i != 1000 ) printf("%9.3f,", temp );
                else            printf("%9.3f ", temp );
        }
        printf("\n};\n");
}
}
clean_tab( Ca )
float Ca[];
{
int nclns;
float temp, low_a, high_a, dif_a;
register int low_icw, high_icw, n_icw, i;

low_icw = 0;
        while( Ca[low_icw] == -1.0 ) low_icw = nxticw( low_icw);

for(;;) {
                nclns = 0;
                while( Ca[nxticw(low_icw)] != -1.0 ) {
                        low_icw = nxticw(low_icw);
                        low_a   = Ca[low_icw];
                        if( ++nclns > 1000 ) {
                                printf("Table cleaned.\n");
                                goto CLEANED;
                        }

}
                if( tstqual('p') ) printf("low_icw=%d, low_a = %10.3f\n",
                                low_icw, raddeg(low_a) );

high_icw= nxticw(low_icw);
                while( Ca[high_icw] == -1.0 ) high_icw= nxticw(high_icw);
                high_a  = Ca[high_icw];
```

```
            if( tstqual('p') )printf("high_icw=%d, high_a = %10.3f\n",
                    high_icw, raddeg(high_a) );

dif_a = high_a - low_a;
            n_icw = high_icw - low_icw;
            if( n_icw < 0 ) n_icw += 1000;
            if( tstqual('p') )       printf("dif_a=%10.3f, n_icw=%d\n",
                                            raddeg(dif_a), n_icw );

dif_a /= n_icw;
            for( i=0; i<=n_icw; i++ ) {
                    temp = low_a + i * dif_a;
                    Ca[low_icw] = temp;
                    if( tstqual('p') )printf("%4d : %10.3f\n",
                            low_icw, raddeg(temp) );
                    low_icw = nxticw(low_icw);
            }
        }

CLEANED:
        temp = Ca[0];
        for( i=0; i<NCW; i++ ) {
                Ca[i] -= temp;
                if( Ca[i] < 0.0 )       Ca[i] += M_2PI;
        }

Ca[1000] = Ca[0];
}
static nxticw( icw )
register int icw;
{
        if( ++icw > 999 )       icw = 0;
        return( icw );
}

FR_cmd( cmd, largs )
register char cmd, *largs;
{
int nsteps;

if( largs )     range( largs, &nsteps, &nsteps );
        else            nsteps = 1;
        printf(" #%d steps %s.\n",
                nsteps, (cmd=='f')?"forwards":"reverse");

if( cmd == 'f' )        Xstep( nsteps );
        if( cmd == 'r' )        Xstep( -nsteps );
}

S_cmd( cmd, largs )
register char cmd, *largs;
{
int ns;
int S[5000];
int icw, stime, ctime;
register int i, j, imin, imax, hmax;

if( *largs )    range( largs, &ns, &ns );
        else            ns = 1000;

for( i=0; i<5000; i++ ) S[i] = 0;

printf("#samples:%4d ", ns );

imin = 5000; imax = 0; hmax = 0;
        for( i=0; i<ns; i++ ) {
                GetFTrans( &icw, &stime, &ctime );
                if( stime < imin )      imin = stime;
                if( stime > imax )      imax = stime;
                S[stime]++;
                if( S[stime] > hmax )   hmax = S[stime];
        } printf("  imin=%4d  imax=%4d  hmax=%4d\n", imin, imax, hmax );
        for( i=0; i<5000; i++ ) {
                if( S[i] == 0 ) continue;
```

```c
                    for( j=i; j<5000; j++ ) {
                            if( S[j] == 0 ) return;
                            printf("%4d:%4d ", j, S[j] );
                            plot_bar( 60 * S[j]/ hmax );
                            printf("\n");
                    }
            }
    } plot_bar( nstars )
    register int nstars;
    {
    char bar[80];
    register char *b;
    register int i;

b = bar;
            while( nstars-- > 0 )   *b++ = '*';
            *b = 0;
            printf("%s", bar );
    }
    T_cmd( cmd, largs )
    register char cmd, *largs;
    {
    float a0, a1;
    int nsteps, ntimes;

if( largs )     {
                    cmd = *largs;

largs = range( largs, &nsteps, &nsteps );
    }
    else            nsteps = 1;
    if( *largs )    largs = range( largs, &ntimes, &ntimes );
    else            ntimes = -1;

do {
                    if( cmd != '-' ) {
                            a0 = GetIangle( 1, 50 );
                            printf("%d times #%d steps forwards(%8.3f)...",
                                                    ntimes, nsteps, raddeg(a0) );
                            Xstep(  nsteps );
                            a1 = GetIangle( 1, 50 );
                            printf("and reverse(%8.3f).\n", raddeg(a1));
                            Xstep( -nsteps );
                    }
                    else {
                            a0 = GetIangle( 1, 50 );
                            printf("%d times #%d steps reverse(%8.3f)...",
                                                    ntimes, nsteps, raddeg(a0) );
                            Xstep( -nsteps );
                            a1 = GetIangle( 1, 50 );
                            printf("and forwards(%8.3f).\n", raddeg(a1) );
                            Xstep(  nsteps );
                    }
            }
            while( --ntimes );
    }

Xstep( nsteps )
register int nsteps;
{
        while( Gsteps );

if( nsteps>0 )  Gpatrn = FWD;
        else            Gpatrn = REV;

Gsteps = abs(nsteps);

while( Gsteps );
        Gpatrn = 0;
}
IniCT()
{
register struct pit *p = PIT;
```

```
                p->pbcr  = 0x80;
                p->pbddr = 0x1f;
                p->pbdr  = 0x00;
}

IntrTicks()
{
register int t;
register struct pit *p = PIT;

Ticks++;

if( !(Ticks%3) && Gsteps ) {
                p->pbdr = Gpatrn;
                Gsteps--;
                if( Gpatrn == FWD )         Tsteps++;
                else                        Tsteps--;
}
else        p->pb
```

What is claimed is:

1. A system for determining the position of a point in space, the system comprising:

at least three stationary retroreflective elements spaced apart from each other and stationed at known coordinates, said retroreflective elements capable of reflecting light back toward a light source;

light transmitting and detecting means positionable at the point for generating a rotating beam of light to illuminate said stationary retroreflective elements during rotation and for receiving said beam of light reflected from said stationary retroreflective elements when said beam illuminates said retroreflective elements, said light transmitting and detecting means including an optical member rotating with said beam, said member having a periphery and further having a plurality of apertures located at said periphery which divide a revolution of said member into a plurality of generally equal partial revolutions, a means for registering a time differential between each adjacent pair of said plurality of apertures as said member rotates, a means for registering a tilt position of one or more reflecting mirrors positioned at said light transmitting and detecting means, and a means for calculating a zenith angle of said beam based on said mirror position; and computer means, responsive to said output signal and said means for detecting movement of each of said at least three stationary retroreflective elements past a predetermined point, for computing the coordinates of the position of the point in space and for computing an orientation for said light transmitting and detecting means when said light transmitting and detecting means are positioned at said point.

2. A system for determining the position of a point in space, the system comprising:

at least three stationary retroreflective elements spaced apart from each other and stationed at known coordinates, said retroreflective elements capable of reflecting light back toward a light source;

light transmitting and detecting means, positionable at the point, for generating a rotating beam of light to illuminate said stationary retroreflective elements during rotation, and for detecting said beam of light when it is reflected from said stationary retroreflective elements and generating an output signal in response thereto, said light transmitting and detecting means including means for generating a beam of light, means for projecting said beam of light at a substantially constant rotating angular velocity toward said retroreflective elements, means for receiving said beam of light reflected from said retroreflective elements corresponding to said illumination of each of said retroreflective elements during each rotation of said beam, and azimuth and zenith means, responsive to reflection of said beam of light from said retroreflective elements, for continuously transmitting angle signals indicative of an azimuth and zenith angle at which said means for receiving said beam of light is positioned with respect to each of said retroreflective elements; and computer means responsive to said output signal for computing from said known coordinates of said retroreflective elements and from the angular orientation of said beam when said beam illuminates said retroreflective elements, the coordinates of the position of the point in space.

3. A system for determining the position of a point in space, the system comprising:

at least three stationary retroreflective elements spaced apart from each other and stationed at known coordinates, said retroreflective elements capable of reflecting light back toward a light source;

light transmitting and detecting means, positionable at the point, for generating a rotating beam of light to illuminate said stationary retroreflective elements during rotation, and for detecting said beam of light when it is reflected from said stationary retroreflective elements and generating an output signal in response thereto, said light transmitting and detecting means including a member rotating with said beam, said member having a periphery and further having a plurality of angularly positioned elements spaced around said periphery which divide a revolution of said member into a plurality of generally equal partial revolutions, and a means for detecting movement of each of said at least three stationary retroreflective elements past a predetermined point as said member rotates;

a calibrating system for calibrating said light transmitting and detecting means, said calibrating system including
- a device having an angularly positioned surface for arbitrarily positioning said light transmitting and detecting means, wherein said light transmitting and detecting means include said member rotating with said beam,
- means for measuring a distance between a first said angularly positioned element and an adjacent second said angularly positioned element,
- means for registering a tilt position of one or more reflecting mirrors positioned at said light transmitting and detecting means, and
- means for calculating a zenith angle of said beam based on said mirror position; and
- computer means, responsive to said output signal and said means for detecting movement of each of said elements past a predetermined point, for computing the coordinates of the position of the point in space.

4. A method for determining the position of a point in space, the method comprising the steps of:
- locating at least three stationary retroreflective elements spaced apart from each other and stationed at known coordinates, said retroreflective elements capable of reflecting light back toward a light source;
- transmitting a rotating beam of light to illuminate said stationary retroreflective elements during rotation;
- measuring an angular position of said retroreflective elements with respect to a known reference;
- tracking scan behavior, said step of tracking scan behavior including the steps of
  - mounting a member on a rotating shaft, said member having a periphery and further having a plurality of apertures located at said periphery which divide a revolution of said member into a plurality of generally equal partial revolutions,
  - registering a time differential between each adjacent pair of said plurality of apertures as said member rotates,
  - registering a tilt position of one or more reflecting mirrors positioned at the point in space, and calculating a zenith angle of said beam based on said mirror position;
- using said scan behavior to calculate angular measurements; and
- determining the position of the point based on said angular measurements and said coordinates of said retroreflective elements.

5. A system for determining the X-Y-Z position coordinates of a point in three dimensional space, said system comprising:
- first, second and third stationary retroreflective elements spaced apart from one another and positioned at known coordinates in said three dimensional space, each of said first and second retroreflective elements including reflector means for reflecting a beam of light back toward a light source, and said third retroreflective element including indicating means for reflecting light back toward said light source for uniquely identifying said third retroreflective element and for providing an indication of the position at which said beam of light impinges upon said third retroreflective element;
- light transmitting and detecting means, located at said point, for generating a beam of light rotated at a zenith angle from vertical to illuminate said reflector means on each of said first and second retroreflective elements and said indicating means on said third retroreflective element;
- said light transmitting and detecting means further detecting light reflected from said reflector means on each of said first and second retroreflective elements and from said indicating means on said third retroreflective element, generating output signals indicative of said reflected light from said reflector means on each of said first and second retroreflective elements and from said indicating means on said third retroreflective element, and generating angle signals indicative of said zenith angle from vertical of said rotating beam of light; and
- means for computing the X-Y-Z coordinates of said point in said three dimensional space from said known coordinates of said retroreflective elements, said output signals indicative of said reflected light from said reflector means on each of said first and second retroreflective elements and from said indicating means on said third retroreflective element and said angle signals indicative of said zenith angle from vertical of said rotating beam of light.

6. A system for determining the position of a point as claimed in claim 5 wherein said computing means are capable of determining an orientation of said light transmitting and detecting means when said light transmitting and detecting means are positioned at the point.

7. A system for determining the X-Y-Z position coordinates of a point in three dimensional space as set forth in claim 5, wherein said reflector means on each of said first and second retroreflective elements comprises indicating means for reflecting light back toward said light source for uniquely identifying each of said first and second retroreflective elements and for providing an indication of the position at which said beam of light impinges upon each of said first and second retroreflective elements.

8. A system for determining the X-Y-Z position coordinates of a point as claimed in claim 7 wherein said indicator means on each of said first, second and third retroreflective elements comprises a distinctive combination of a retroreflective slant target and a retroreflective bar code.

9. A system for determining the X-Y-Z position coordinates of a point in three dimensional space as set forth in claim 5, wherein said light transmitting and detecting means includes means for varying said zenith angle from vertical of said rotating beam of light.

10. A method for determining the X-Y-Z position coordinates of a point in three dimensional space, said method comprising:
- providing first, second and third stationary retroreflective elements spaced apart from one another and stationed at known coordinates in said three dimensional space, each of said first and second retroreflective elements including reflector means for reflecting a beam of light back toward a light source, and said third retroreflective element including indicating means for reflecting light back toward said light source for uniquely identifying said third retroreflective element and for providing an indication of the position at which said beam of light impinges upon said third retroreflective element;
- projecting from said point a beam of light rotated at a zenith angle from vertical to illuminate said reflector means on each of said first and second retroreflective elements and said indicating means on said third retroreflective element;

detecting at said point light reflected from said reflector means on each of said first and second retroreflective elements and from said indicating means on said third retroreflective element;

generating output signals indicative of said detected reflected light from said reflector means on each of said first and second retroreflective elements and from said indicating means on said third retroreflective element;

generating angle signals indicative of said zenith angle from vertical of said rotating beam of light; and determining the X-Y-Z coordinates of said point in said three dimensional space from said known coordinates of said retroreflective elements, said output signals indicative of said reflected light from said reflector means on each of said first and second retroreflective elements and from said indicating means on said third retroreflective element and said angle signals indicative of said zenith angle from vertical of said rotating beam of light.

11. A method for determining the X-Y-Z position coordinates of a point in three dimensional space as set forth in claim 10, wherein said reflector means on each of said first and second retroreflective elements comprises indicating means for reflecting light back toward said light source for uniquely identifying each of said first and second retroreflective elements and for providing an indication of the position at which said beam of light strikes upon each of said first and second retroreflective elements.

* * * * *